United States Patent
Wissell et al.

(12)

(10) Patent No.: US 6,407,575 B1
(45) Date of Patent: Jun. 18, 2002

(54) LOAD INSENSITIVE CLOCK SOURCE TO ENABLE HOT SWAP OF A NODE IN A MULTIPROCESSOR COMPUTER SYSTEM

(75) Inventors: Daniel Wissell; George S. Checkowski, both of Acton, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/583,965

(22) Filed: May 31, 2000

(51) Int. Cl.[7] .............................. G06F 13/00; H03K 3/00
(52) U.S. Cl. ...................... 326/30; 327/295; 333/109; 326/93; 710/103
(58) Field of Search ..................... 326/30, 93; 333/109, 333/1; 327/295, 184, 291; 710/103, 129

(56) References Cited

U.S. PATENT DOCUMENTS 5,519,362 A * 5/1996 Li et al. ....................... 332/130
6,184,736 B1 * 2/2001 Wissell et al. ............... 327/295
6,239,387 B1 * 5/2001 Wissell ......................... 174/262

\* cited by examiner

*Primary Examiner*—Michael Tokar
*Assistant Examiner*—Daniel D. Chang
(74) *Attorney, Agent, or Firm*—Cesari and McKenna, LLP; Edwin H. Paul, Esq.

(57) ABSTRACT

A load-insensitive circuit enables a global reference clock signal source of a synchronous multiprocessor system having a plurality of nodes to be "insensitive" with respect to the insertion or removal ("hot-swap") of a load (such as a node) when the system is operational. The load insensitive clock source is provided through the use of a customized two-way passive radio frequency power splitter having an input port and two phase-matched output ports. A high degree of isolation is provided between clock signals delivered over the output ports when the input port of the splitter is properly terminated and embedded in a controlled impedance environment. Isolation is further enhanced by terminating each output port with a constant impedance comprising a precisely-matched, 50-ohm impedance load pad.

1 Claim, 3 Drawing Sheets

LOAD INSENSITIVE CLOCK SOURCE TO ENABLE HOT SWAP OF A NODE IN A MULTIPROCESSOR COMPUTER SYSTEM

FIELD OF THE INVENTION

The present invention relates to clock sources used in multiprocessor computers and, in particular, to a synchronous reference clock source used in a distributed multiprocessor system having a plurality of nodes, each of which may be "hot-swapped".

BACKGROUND OF THE INVENTION

A multiprocessor computer may comprise a plurality of subsystems or "nodes" that are interconnected to form a system with high processor counts. Each multiprocessor node may contain a plurality of components, such as processors, memory and an input/output (I/O) subsystem. The I/O subsystems are further interconnected to enable communication between the nodes. The multiprocessor system is a synchronous system; that is, a global signal source of the system generates and provides periodic signals to the nodes in "synchronization," i.e., at the same time. The global signal source may comprise a sinusoidal radio-frequency source configured to generate sinewave clock signals for distribution among the nodes.

The synchronous multiprocessor system may further comprise a "high availability" system that supports "hot-swap" (i.e., an insertion or removal) of a node while the remaining nodes of the system continue to operate. Insertion or removal of a load from an operating synchronous multiprocessor system having a global signal source generally causes the clock system to fail (i.e., become non-synchronous). Failure of the clock system may arise because of interactions between properly terminated clock branches of the clock system and an improperly terminated clock branch caused by hot-swapping of a clock branch load. In addition to a node, the clock branch load may comprise a system module or a collection of modules within the multiprocessor system.

Hot-swapping a node within a multiprocessor system is a relatively recent concept, particularly with respect to a system having a global sinewave clock source. Nevertheless, the present state of the art does not teach a method of notifying the global clock source prior to a node being removed or added from the system. That is, the multiprocessor system generally has no active system control over the global clock system that can deselect a clock branch before the clock load is removed. The global signal source must therefore be configured to electrically withstand physical insertion or removal of a node from the system without interrupting operation of remaining ("neighboring") nodes operating within the system.

However, an approach to inserting a node into a running synchronous multiprocessor system may involve activating the clock signals provided to the inserted node from the global signal source so that the clock signals arrive at the inserted node in synchronization with the clock signals supplied to the neighboring node. This activation method is somewhat difficult and complicated because the time needed for the clock signals to propagate to the components of the inserted node must be determined prior to supplying the clock signals to the inserted node. Furthermore, the time needed for the clock signals to "lock onto" clock-supporting circuitry, such as phase lock loops (PLLs), must be determined. Once the PLLs have locked to the reference clock signals, the inserted node may then be powered up such that each of its constituent components is activated.

The activation method is indeterministic and, therefore, generally undesirable. Moreover, extensive circuitry may be required within each node to determine when the reference clock signals supplied to the components of the node are in synchronization. This information is needed so that system software may be notified to allow the inserted node to become part of the operating system set of the multiprocessor system. The present invention is directed to a load-insensitive clock source that enables efficient hot-swap of a node from an operating synchronous multiprocessor system.

SUMMARY OF THE INVENTION

The present invention comprises a novel circuit that enables a global reference clock source of a synchronous multiprocessor system having a plurality of nodes to be "insensitive" with respect to the insertion or removal ("hot-swap") of a load (such as a node) when the system is operational. In particular, the load insensitive clock source is provided through the use of a customized two-way passive radio frequency (RF) power splitter having an input port and two phase-matched output ports. A high degree of isolation is provided between clock signals delivered over the output ports when the input port of the splitter is properly terminated and embedded in a controlled impedance environment. Isolation is further enhanced by terminating each output port with a constant impedance. According to the present invention, the constant impedance comprises a precisely-matched, 50-ohm impedance load pad.

Advantageously, the inventive circuit allows the global reference clock source to be "load insensitive". By providing such a load insensitive global clock source, synchronous interaction between the hot-swapped node and its neighboring node of the multiprocessor system is not required.

BRIEF DESCRIPTION OF THE DRAWINGS

The above and further advantages of the invention may be better understood by referring to the following description in conjunction with the accompanying drawings, in is which like reference numbers indicated identical or functionally similar elements.

DETAILED DESCRIPTION OF AN ILLUSTRATIVE EMBODIMENT

Figure 1:
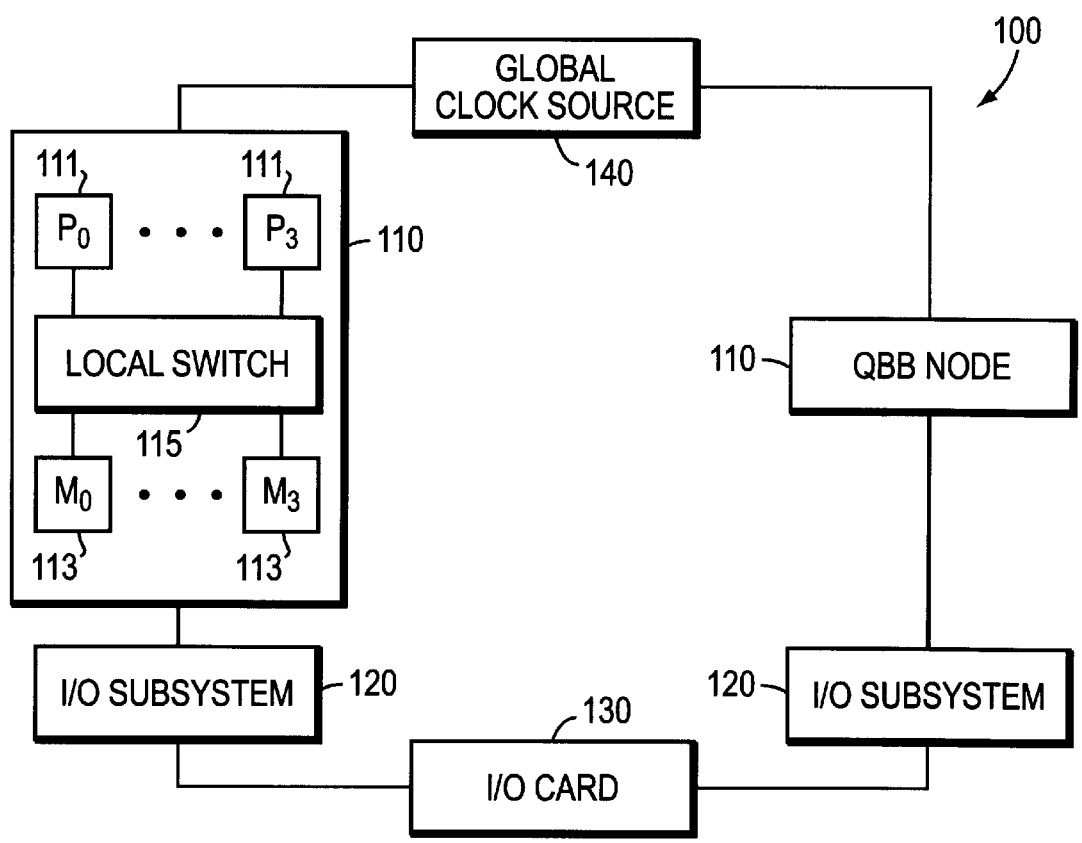
FIG. 1 is a schematic block diagram of a synchronous multiprocessor system that may be advantageously used with the present invention.

FIG. 1 is a schematic block diagram of a synchronous multiprocessor system 100 that may be advantageously used with the present invention. The multiprocessor system 100 includes a plurality of nodes 110, each of which includes a plurality of processors 111 coupled to an input/output (I/O) subsystem 120. The I/O subsystems 120 are connected by an I/O card 130 to facilitate communication between the nodes 110. That is, the I/O card 130 essentially transposes signals exchanged among the nodes 110 such that input signals received from a source QBB node are transformed to output signals and provided as input signals to a destination QBB node of the system. The system further includes a global clock source 140 that preferably generates sinewave clock signals and distributes those signals over radial clock lines to the nodes of the multiprocessor system 100.

In the illustrative embodiment, the multiprocessor system 100 is a symmetric multiprocessor system (SMP) and each node 110 is a quad building block (QBB) node having four (4) processors coupled to memory modules 113 via a local switch 115. An example of an SMP system that may be advantageously used with the present invention is the Wild-Fire GS80 system manufactured by Compaq Computer Inc. An example of a global sinewave clock source that may be advantageously used with the present invention is given in U.S. patent application entitled, Sinusoidal radio-frequency clock distribution system for synchronization of a computer system, Ser. No. 07/862,796 assigned to the assignee of the present invention and incorporated herein in its entirety by reference. Notably, neither the I/O card 130 nor the node 110 has the capability of controlling the global clock source 140 with respect to generation of the sinewave clock signals when hot-swapping one of the nodes 110 from the multiprocessor system 100.

Figure 2:
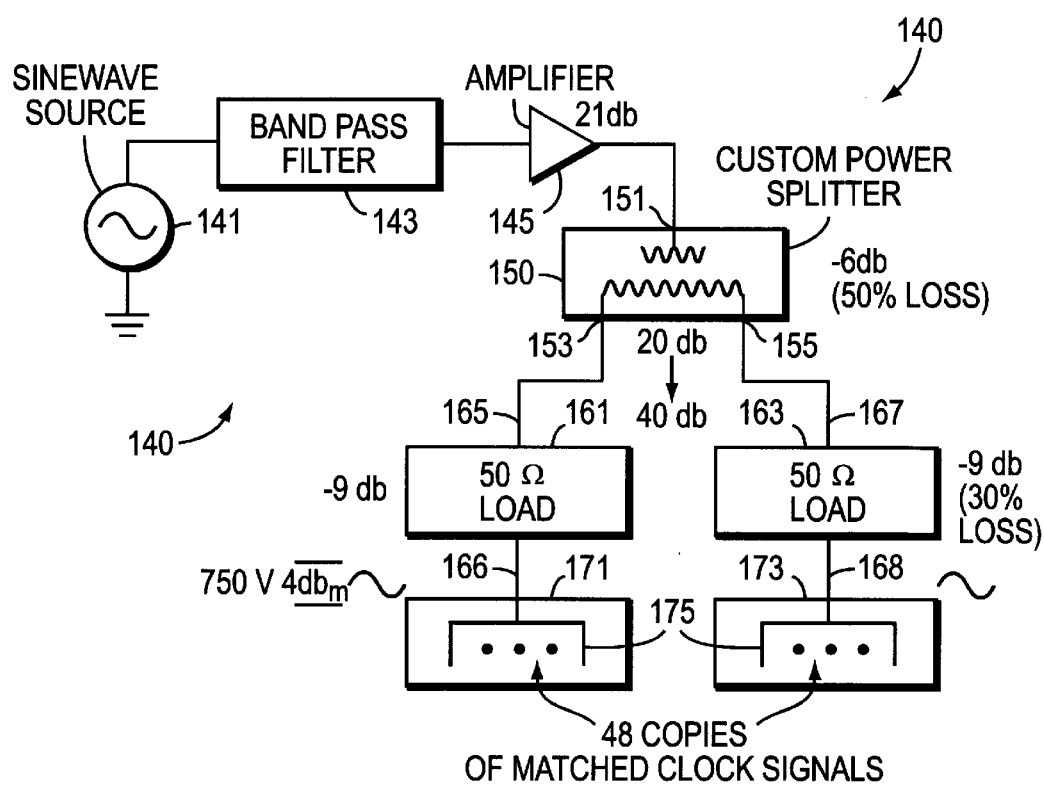
FIG. 2 is a functional block diagram of a global clock source that may be advantageously used with the present invention.

FIG. 2 is a functional block diagram of the global clock source 140 that may be advantageously used with the present invention. The global clock source 140 includes a signal source 141, such as an oscillator, for generating periodic signals, such as a sinewave signal. The generated clock signals are appropriately bandpass filtered by a bandpass filter 143 and then amplified where necessary by an amplifier 145 to produce relatively high-powered sinewave clock signals at its output. Each amplified clock signal is provided to an input 151 of a custom power splitter device 150 that produces two matched copies of the input signal at output ports 153 and 155 of the power splitter device 150.

Specifically, the power splitter 150 includes a transformer having an input port and a plurality of output ports with a grounded center tap to provide electrical isolation of at least 20 decibels (db). For an application in which there is desired no measurable perturbance among the generated sinewave clock signals distributed to the nodes 110 of the multiprocessor system 100, the sinewave signals provided at the output ports 153 and 155 of the power splitter 150 should be totally independent.

For an additional improvement in performance, the global clock source 140 includes precision 50-ohm impedance load pads 161 and 163 integrated with respective etch lines 165 and 167 emanating from the respective output ports 153 and 155 of the power splitter 150. The impedance load pads 161 and 163 are preferably high-quality, custom resistor components implemented as resistive circuits (shown in FIG. 3) mounted directly on the etch lines 165 and 167. Preferably, the 50-ohm impedance load pads 161 and 163 are physically and electrically identical. By using identically matched impedance loads, the electrical isolation of the power splitter 150 is increased by at least two orders of magnitude (i.e., by an additional 20 db) to at least 40 db. Moreover, by using a value of 50 ohms, there is provided an additional 9 db of isolation for a composite signal isolation of approximately 50 db between the output port 153 and the output port 155 of the power splitter 150. Advantageously, the 50-ohm impedance load pads 161 and 163 also provide total isolation between the input lines 165 and 167, and the respective output lines 166 and 168 of the impedance load pads 161 and 163.

By implementing the inventive circuit described herein, the clock signals 171 and 173 at the respective output lines 166 and 168 are matched in terms of phase and amplitude. In addition, the clock signals 171 and 173 track in terms of amplitude within approximately 1 millivolt when a load (such as one of the nodes 110) is removed and replaced (i.e., "hot-swapped") in the multiprocessor system 100. The clock signals 171 and 173 are preferably 4 dbm signals that are 750 millivolt peak-to-peak in amplitude. Each clock signal 171 and 173 is provided to a clock splitter circuit 175 within each node 110 that generates, for example, 48 copies of matched clock signals for distribution over a clock distribution tree (not shown) of the node 110.

Advantageously, a hot-swap procedure of a node 110 in the microprocessor system 100 does not impact the operation of a neighboring node 110. That is, the node 110 may be inserted or removed without causing any perturbance to the global clock source 140. As a result, the inventive load-insensitive global clock source 140 described herein provides a simple yet elegant solution for a two-node SMP system, such as the GS80 WildFire system.

Figure 3:
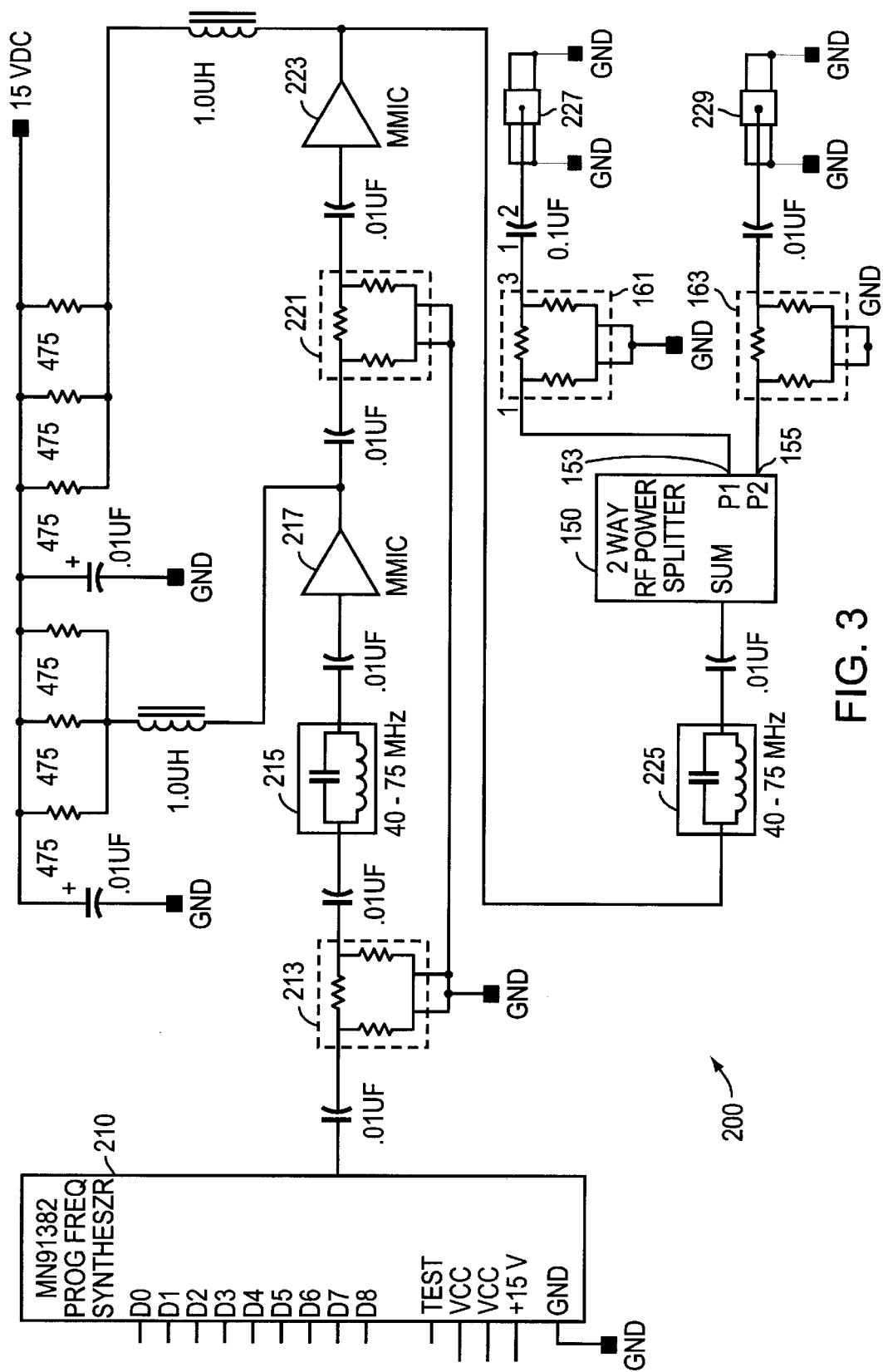
FIG. 3 is a detailed schematic diagram of an illustrative embodiment of the load insensitive clock source circuit.

FIG. 3 is a detailed schematic diagram of an illustrative embodiment of a load insensitive global clock source circuit 200. As shown in the embodiment, the signal source is provided by a programmable frequency synthesizer 210, which provides an RF sinewave signal of the required frequency and amplitude. The RF sinewave signal has a 50 ohm nominal impedance and is terminated by a first constant impedance network 213. This configuration insures that the programmable frequency synthesizer 210 is properly terminated and provides a constant 50-ohm impedance for the remainder of the signal path. The RF signal is filtered by a first constant impedance bandpass filter 215 that removes harmonics from the RF signal. The resultant filtered signal is isolated from the programmable frequency synthesizer 210 by a first amplifier 217. The output of the first amplifier 217 is terminated by a second constant impedance circuit 221, again establishing a constant 50-ohm impedance. The RF signal is further amplified by a second amplifier 223 to establish a required RF signal amplitude. A second constant impedance bandpass filter 225 is provided to remove any unwanted higher-order harmonics generated by the amplifiers 217 and 223.

The highly impedance-controlled signal is then input to the power splitter device 150. At this point, the two output ports 153 and 155 of the power splitter 150 are substantially isolated, providing the output port 153 with greater than 50 db isolation from the output port 155. To increase isolation further, the output ports 153 and 155 are terminated with the 50-ohm impedance load pads 161 and 163. It has been empirically determined that the illustrative implementation provides an isolation of over 60 db between clock output ports 227 and 229. With this level of isolation, there is virtually no interaction in the amplitude of the outputs 153 and 155 of the power splitter device 150. Phase matching used to guarantee that both outputs 153 and 155 are synchronous is controlled by construction of the power splitter and by transmission line length matching on a printed wiring board.

In summary, the invention provides two copies of a sinewave-based global referenced clock signal that are virtually identical in terms of amplitude, frequency and phase. The identical copies of the clock signal are generated at output ports of the power splitter transformer and are provided to the QBB nodes. These clock signals are electrically isolated such that a change in the clock load at one output of the transformer does not impact the amplitude, frequency or phase of the clock signals provided at the other output of the transformer. Therefore if a load (such as QBB node) is removed or added from the SMP system, it has no impact on the other node in the system. This allows an entire clock subsystem used within a QBB node to be physically removed with no impact on the other fully functional QBB node. Moreover, the disconnected QBB node may be re-inserted at any time and the global referenced clock signals will be fully synchronous with the running QBB node.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A clock source suitable for use in a computer system, said clock source comprising:

a signal source having a periodic signal output;

a bandpass filter connected to said periodic signal output, said bandpass filter for removing at least some of the harmonics present in said periodic signal out put and producing a filtered signal output;

an amplifier connected to said bandpass filter, said amplifier for producing an amplified signal output;

a power splitter for receiving said amplified signal output and producing a first and a second matched clock signal outputs, said first matched clock signal out-put having an electrical isolation of at least twenty decibels (20 db) from said second matched clock signal output;

a first matching resistance connected to receive said first matched clock signal out put and produce a first isolated clock signal;

a second matching resistance connected to receive said second matched clock signal output and produce a second isolated clock signal, wherein said first and said second matching resistances provide a proper termination for the amplified signal output, and clock output ports for connecting each matched clock signal to a number of clock receivers, wherein the number of clock receivers may be from none to a plurality of clock receivers, wherein the number of clock receivers connected to either clock output port has substantially no effect on the clock signals.

\* \* \* \* \*